United States Patent [19]

Pall

[11] 4,361,483
[45] Nov. 30, 1982

[54] DISPOSABLE PHARMACEUTICAL FILTER ASSEMBLY

[75] Inventor: David B. Pall, Roslyn Estates, N.Y.

[73] Assignee: Pall Corporation, Glen Cove, N.Y.

[21] Appl. No.: 317,665

[22] Filed: Nov. 2, 1981

[51] Int. Cl.³ .............................................. B01D 25/02
[52] U.S. Cl. .................................. 210/445; 210/446; 210/451; 210/927
[58] Field of Search ............... 210/248, 435, 446, 448, 210/450, 451, 927, 238, 240, 433.1, 445

[56] References Cited

U.S. PATENT DOCUMENTS

| | | | |
|---|---|---|---|
| 2,554,748 | 5/1951 | Lewis et al. | 210/248 |
| 2,931,507 | 4/1960 | Kent | 210/445 |
| 3,386,585 | 6/1968 | Weland et al. | 210/446 |
| 3,794,180 | 2/1974 | Blocker | 210/446 |
| 3,856,683 | 12/1974 | Parr | 210/445 |
| 3,935,111 | 1/1976 | Bentley | 210/446 |
| 4,126,554 | 11/1978 | Cooper | 210/445 |
| 4,126,558 | 11/1978 | Luceyk | 210/927 |
| 4,148,732 | 4/1979 | Burrow et al. | 210/446 |

*Primary Examiner*—John Adee

[57] ABSTRACT

A disposable unitary filter assembly is provided for filtering pharmaceutical and other fluid materials without danger of contaminating downstream effluent in the event of leakage of unfiltered fluid material past a filter seal, comprising, in combination, a filter housing of plastic material comprising first and second housing parts; the first housing part having a first fluid chamber open at one side, a fluid port opening into the fluid chamber, and a peripheral sealing surface extending in at least two planes at an angle to each other of from 30° to 150°; the second housing part having a second fluid chamber open at one side, a fluid port opening into the fluid chamber and a peripheral sealing surface extending in at least two planes at an angle to each other of from 30° to 150°; a filter element disposed in the second fluid chamber in the second housing part and comprising a tubular filter confined between and sealed in a fluid-tight seal to end caps at each end thereof, of which a first end cap is closed, and a second end cap is of plastic material and has an opening therethrough communicating the interior of the tubular filter with the first fluid chamber, and a peripheral lip extending into sealing engagement with and between the peripheral sealing surface of each housing part in each plane thereof and permanently bonded thereto; the peripheral lip extending across and sealingly closing off the open sides of the first and second fluid chambers, so that fluid communication therebetween is restricted to the opening in the second end cap via the filter, and the leakage path at the end cap peripheral lip does not bypass the filter, but runs to the exterior of the housing between the lip and one housing part.

19 Claims, 4 Drawing Figures

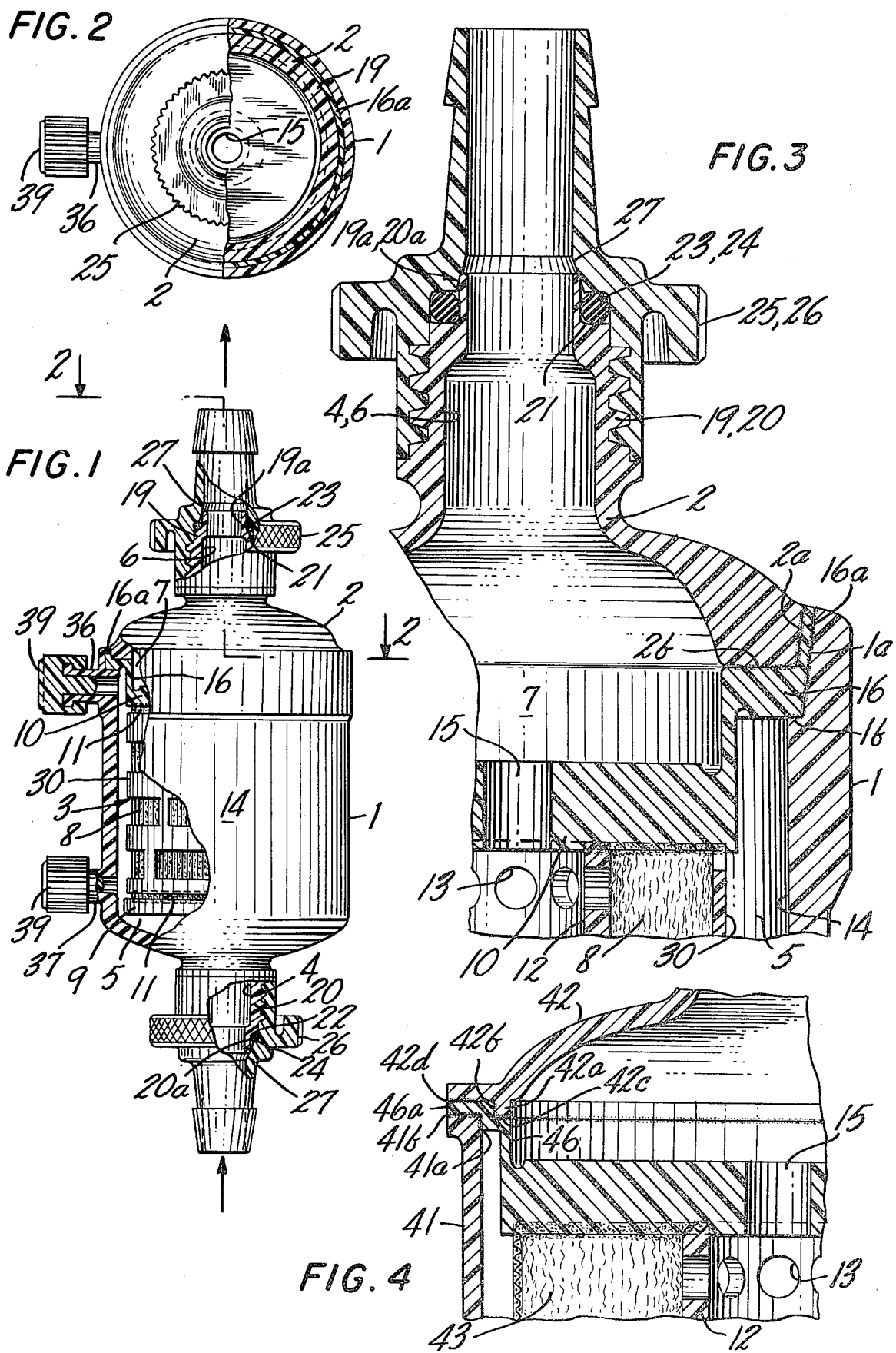

DISPOSABLE PHARMACEUTICAL FILTER ASSEMBLY

Pharmaceutical filters must meet rigid requirements, and for this reason most designs of commercial filters are not acceptable. All portions of the filter assembly that come into contact with the fluid to be filtered must be sterile and moreover contamination of the downstream filtered effluent by unfiltered material bypassing the filter cannot be tolerated, because of the dangerous and possibly even fatal consequences to the patient, to whom the filtered pharmaceutical fluid material may eventually be administered.

It is common practice in the pharmaceutical industry to sterilize a filter in situ in the system in which it is used. This means that the sterilizing fluid, usually steam or ethylene oxide gas, must reach every part of the filter, even on the outside of any resilient seal, due to the possibility of the seal's pumping contaminants into the system during internal pressure changes. This requirement makes unacceptable for pharmaceutical use any filter having internal resilient seals that prevent access of sterilizing gas to any part of the interior of the filter unit.

Moreover, commercial filters normally provide sealing to the filter housing in a manner to compel fluid flow through the filter, but with leakage paths at the sealing element such that unfiltered fluid bypassing the sealing element due to a faulty seal can enter and contaminate the filtered downstream effluent.

U.S. Pat. No. 3,696,932 patented Oct. 10, 1972 provides a filter design which makes impossible bypass of a filter with contamination of the downstream effluent, by providing a leakage path which extends to the outside of the housing. This leakage path is delineated between specially structured end cap and filter housing parts, and by eliminating sealing means, but relying instead upon an integrated welding or fusing of the housing and end cap component parts, where feasible, and a tapered seal between the parts where not feasible. This design has however proved expensive to manufacture, and the resulting high cost of the filter assemblies has limited their usefulness to areas where high cost can be tolerated, such as in blood filter transfusions, extracorporeal blood circulation systems, and similar applications where the life of the patient is at stake, and the cost of a filter assembly is minor compared to other aspects of the procedure.

A further design difficulty is posed by the necessity that all component parts of the filter assembly that come into contact with fluid be absolutely sterile. This requires fabrication from materials that can be made sterile without deterioration, and this precludes the usual materials of construction of commercial filter assemblies, particularly filter elements. It also precludes as well any complications in design, such as nooks, crevices, and crannies, in which bacteria may lodge, and escape unscathed in the sterilization procedure.

Exemplary commercial filter designs which have interesting features but which overall are unsuitable for pharmaceutical application are those disclosed in U.S. Pat. Nos. 2,808,937 to O'Meara dated Oct. 8, 1957, 2,931,507 to Kent dated Apr. 5, 1960, and 3,856,683 to Parr dated Dec. 24, 1974.

O'Meara U.S. Pat. No. 2,808,937 provides a filter with two housing parts held together by a V-ring metal clamp, with a filter element in between. This filter has however an insufficient surface area for the volume it occupies, and is in no way suitable for fine filtration, because there is no support for the filter element against differential pressure. It is clearly intended for use only as a coarse gravity filter, in which event there is only a small proportion of material removed relative to the volume treated, as in the filtration of milk.

Kent U.S. Pat. No. 2,931,507 provides a filter for use with gases and liquids such as gasoline and oil, with a removable filter unit, but assembly and disassembly requires the removal of a number of bolts, and the device is of a rather heavy and bulky construction and unsterilizable.

Parr U.S. Pat. No. 3,856,683 provides a dual flow fluid filter with identical filters arranged back to back with a peripheral dam therebetween, which compels fluid flow to proceed from the outside of one filter into the interior, and then into the interior of the other filter and back to the outside. This design is unsuitable where only one filter is sufficient.

Cooper U.S. Pat. No. 4,126,559 provides a filter assembly for filtering pharmaceutical fluid materials which can be sterilized in situ in a fluid line because every portion of the interior of the assembly is accessible to sterilizing fluid, and which provides a leakage path at the filter seal to the outside of the assembly, so that there is no danger of contaminating downstream filtered effluent with unfiltered fluid material, in the event of leakage past the filter seal. The filter assembly comprises, in combination, a filter housing comprising first and second housing parts; the first housing part having a first fluid chamber open at one side, a fluid port opening into the fluid chamber, and a peripheral sealing lip; the second housing part having a second fluid chamber open at one side, a fluid port opening into the fluid chamber and a peripheral sealing lip; sealing means between the peripheral sealing lips; retaining means holding the housing parts and sealing means in fluid-tight juxtaposition; a filter element disposed in the second fluid chamber in the second housing part and comprising a tubular filter confined between and sealed in a fluid-tight seal to end caps at each end thereof, of which a first end cap is closed, and a second end cap has an opening therethrough communicating the interior of the tubular filter with the first fluid chamber, and a peripheral lip extending into sealing engagement with the sealing means and shaped to fit between the seal against one peripheral sealing lip of one housing part, the peripheral lip extending across and sealingly closing off the open sides of the first and second fluid chambers, so that fluid communication therebetween is restricted to the opening in the second end cap via the filter, and the leakage path at the end cap peripheral lip seal past the sealing means does not bypass the filter but runs to the exterior of the housing between the housing parts.

The Cooper design makes it perfectly feasible to reuse a filter assembly after replacement of the filter element and resterilization. This design is easy to assembly and disassemble, and permits such assembly and disassembly without contamination of sterile parts, or alternatively, which permits sterilization of the completed filter assembly.

Frequently, however, a filter assembly that has to be disassembled and reassembled to replace the filter element when loaded with contaminants in order to justify its high initial cost is not acceptable, and a disposable filter assembly is desired instead. Such an assembly must be simple enough in design and easy enough to manufacture of inexpensive materials to permit its being marketed at low cost.

In accordance with the present invention, a disposable unitary filter assembly is provided for filtering pharmaceutical fluid materials without danger of contaminating downstream effluent in the event of leakage of unfiltered fluid material past a filter seal, comprising, in combination, a filter housing of plastic material comprising first and second housing parts; the first housing part having a first fluid chamber open at one side, a fluid port opening into the fluid chamber, and a peripheral sealing surface extending in at least two planes at an angle to each other of from 30° to 150°; the second housing part having a second fluid chamber open at one side, a fluid port opening into the fluid chamber and a peripheral sealing surface extending at least in two planes at an angle to each other of from 30° to 150°; a filter element disposed in the second fluid chamber in the second housing part and comprising a tubular filter confined between and sealed in a fluid-tight seal to end caps at each end thereof, of which a first end cap is closed, and a second end cap is of plastic material and has an opening therethrough communicating the interior of the tubular filter with the first fluid chamber, and a peripheral lip extending into sealing engagement with and between the peripheral sealing surface of each housing part in each plane thereof and permanently bonded thereto; the peripheral lip extending across and sealingly closing off the open sides of the first and second fluid chambers, so that fluid communication therebetween is restricted to the opening in the second end cap via the filter, and the leakage path at the end cap peripheral lip does not bypass the filter, but runs to the exterior of the housing between the lip and one housing part.

A further feature of the invention is a connector for attaching a filter housing to a fluid line that protects sealing means for the connector from contact with fluid passing through the housing and the connector, comprising, in combination, a filter housing having a fluid chamber, a fluid port opening into the fluid chamber, and a first connector having a fluid passage therethrough and attached to and extending outwardly from the the filter housing and having side surfaces adapted for attachment to lapped side surfaces of a connector for a fluid line; a second connector having a fluid passage therethrough and removably attached to the first connector and concentric therewith in a manner such that one connector is within the other and side surfaces thereof extend along side surfaces of the first connector; sealing means disposed between and sealing the juxtaposed side surfaces of the first and second connectors in a fluid-tight seal; the outer connector extending beyond the inner connector and having an inwardly tapering fluid passage wall having a lesser diameter than the outside diameter of the inner connector and engaging the end of the inner connector in a fluid-tight seal preventing entry of fluid between the connectors and thereby preventing fluid from reaching the sealing means.

This embodiment of the invention as illustrated in the drawings can be used with the disposable unitary filter assembly of the invention, but it also has utility in any type of filter unit where the fluid should not be brought into contact with sealing means, either to prevent contamination of the fluid, or corrosive attack on the sealing means, or both.

A preferred embodiment of the invention is illustrated in the drawings, in which:

FIG. 1 represents a side view partly in longitudinal section through a filter assembly in accordance with the invention;

FIG. 2 represents a cross-sectional view taken along the line 2—2 of FIG. 1, and showing a portion of one end cap of the filter;

FIG. 3 represents a detail view of the joint between the two housing parts and the peripheral lip of the filter element end cap; and FIG. 4 represents a longitudinal section through another embodiment of filter assembly of the invention.

The filter assembly shown in FIGS. 1 to 3 comprises a first, normally the bottom, housing part 1, in this case a filter bowl; a second housing part 2, normally the cover; and a filter element 3 disposed in the first housing part 1. The first housing part 1 has a fluid port 4, leading into a first fluid chamber 5. The second housing part 2 has a fluid port 6, leading into a second fluid chamber 7.

In the arrangement shown, the fluid port 4 would normally be the unfiltered fluid inlet into the housing, and the fluid chamber 5 the upstream unfiltered fluid chamber. The fluid chamber 7 would receive filtered fluid from the filter, and the fluid port 6 would serve as the filtered fluid outlet port from the housing. However, the reverse is also possible, with flow in the reverse direction. Also, the housing part 1 can be at the top, and part 2 at the bottom; the assembly can also be arranged horizontally, or at any desired angle to the horizontal or vertical.

The filter element 3 comprises a tubular filter 8 confined between end caps 9, 10, each sealed to the ends of the filter tube 8 by a potting compound 11. The filter 8, in this case a bacteria-proof filter, pore size absolute less than 0.3 micron, such as a membrane or porous plastic sheet, is supported on an internal core 12, in this case a tube made of polypropylene or other plastic, with a number of ports 13 therethrough, for flow of fluid passing through the filter 8, into or out from the interior chamber 14 of the filter 8. The exterior of the filter is confined within a wrap 30 of extruded polypropylene or other plastic netting such as Vexar, or in the case of a filter flowing from port 6 to port 5, a perforate molded plastic sleeve.

It will now be seen that the chamber 7 is in fluid communication with the interior chamber 14 of the tubular filter by way of the aperture 15 in the end cap 10. Since the end cap 9 closes off the other end of the tubular filter, fluid flow between the chambers 5 and 7 and the filter 8 is only via the interior chamber 14 of the filter 8.

The end cap 10 has a peripheral lip 16 that extends all the way across the chambers 5, 7, closing off that side of each chamber.

As best seen in detail, FIG. 3, the peripheral lip 16 terminates in an end flange 16a extending at a 95° angle to the central portion of the lip. The cover 2 has a side peripheral surface 2a engaging the side of the flange 16a, and a bottom peripheral surface 2b at an angle of 95° to surface 2a, and nesting in the upper side of flange 16a and the top of the lip 16, locating it precisely with respect to the cover.

The bowl 1 has a side peripheral surface 1a engaging the opposite side of flange 16a, and a ledge 1b engaging the bottom of lip 16, locating it precisely with respect to the bowl. Not only are the lip 16 and thus the filter element 3 located precisely with respect to the cover and bowl, but they are held thereby while sealing or bonding the lip 16 to each of the cover and bowl proceeds, thus making it possible to bond and seal all three parts together at one time, and form a unitary or one-piece disposable filter assembly.

If the cover, bowl and lip are all of plastic, either the same plastic, such as polypropylene, polyamide, or polyester, or two melt compatible plastics, they can all be melt-sealed or sinter-, adhesive- or solvent-bonded or fusion, friction or ultrasonic welded together at the joint shown in FIG. 3.

It will now be apparent that because of the lip 16 the fluid chambers 5, 7 are effectively separated against fluid flow therebetween, except through the filter 8 and the open interior 14 of the filter. The flange 16a of the lip 16 embraced between the cover 2 and bowl 1 at surfaces 2a, 2b, 1a, 1b in a fluid-tight seal ensures that any leakage that may arise at the seal cannot bypass the end cap 10 and its lip 16, but instead passes to the exterior of the filter housing between the two housing parts 1, 2 at the joint.

Each of the ports 4, 6 is provided with standardized connections 24, 25, for attachment to a fluid line. These are sealed thereto by way of a ring seal, which is protected from contact with and therefore contamination of fluid passing through the ports 4, 6 by a special design feature of the invention.

At the ports 4, 6 the housing parts 1, 2 have projecting threaded nipples 19, 20, which carry peripheral grooves 21, 22 in which is ledged an O-ring seal 23, 24. The connectors 25, 26 thread onto the nipples, but have a tapered internal wall 27 engaging the ends 19a, 20a of each nipple in a fluid-tight line seal when the connectors are threaded hard onto the nipples. This seal prevents fluid passing through the ports from reaching the O-ring seals 23, 24. In place of O-rings, other types of ring seals can be used, such as trapezoidal and triangular ring seals, or gaskets.

The housing part 2 is also provided with a port 36, serving as a vent, drain or inlet feed port, and a port 37, serving as a vent, drain or inlet feed port, but these are not essential, and either or both can be omitted. For convenience, the ports 36, 37 can be provided with Luer fittings or Pharmaseal fittings, for reception of containers or delivery means with standardized mating Luer or Pharmaseal fittings. The ports 36, 37 are also provided with caps 39, so that they can be kept normally closed, but opened when desired, such as to vent air port 36 from within the chamber 5 at the time the filter is filled (possibly via port 37) preparatory to being put onstream.

Instead of a cap, the port 37 can be fitted with a valve optionally provided with a Luer fitting, for sampling of fluid within the chamber 5 while it is onstream, or so as to ascertain when contamination build-up requires removal of the filter from service.

Assembly of the filter is quite simple. The filter 3 is placed in the open bowl 1 located by the lip flange 16a, and the cover 2 then fitted into the lip 16 and flange 16a. The composite is then sealed by application of heat locally to the joint at 1a, 1b, 16a, 2a, 2b, or by ultrasonic welding. A bonding agent or solvent-bonding can also be used. The connectors 19, 20 can be attached to the bowl 1 before or after the assembly of parts 1, 2 and 3.

In normal use, fluid flow would be as indicated by the arrow, via port 4 as inlet, to port 6 as outlet, since the exterior surface of the filter 8 has a larger available volume than the interior, for collection of contaminants removed by the filter. However, if the volume of contaminants to be removed is not unduly great, fluid flow can equally well proceed via port 6 as inlet to port 4 as outlet, with the contaminants being collected on the inside surface of the filter. Under such reverse flow, since the differential fluid pressure is applied against the inside of the filter, the external supporting sheath 30 about the exterior of the filter 8 assumes the function of the internal core 12.

In the embodiment shown in FIG. 4, the housing cover, bowl and peripheral sealing lip are provided with outwardly or radially extending sealing peripheral surfaces.

As best seen in detail, FIG. 4, the peripheral lip 46 terminates in an end flange 46a extending in a zig-zag with three 90° angles to the central portion of the lip. The cover 42 has a projection 42a with side peripheral surface 42b and bottom surface 42c at a 90° angle thereto engaging the first two of the three cover-facing sides of the flange 46a, and a bottom peripheral surface 42d at an angle of 90° to surface 42b, and nesting in the upper side of the three bends of flange 46a, locating the lip 46 precisely with respect to the cover.

The bowl 41 has a side peripheral surface 41a engaging the opposite side of flange 46a, and an end surface 41b engaging the bottom of flange 46a, locating it precisely with respect to the bowl. Not only are the lip 46 and thus the filter element 43 located precisely with respect to the cover and bowl, but they are held thereby while sealing or bonding the lip 46 at flange 46a to each of the cover and bowl precisely, thus making it possible to bond and seal all three parts together at one time, and form a unitary or one-piece disposable filter assembly.

If the cover, bowl and lip are all of plastic, either the same plastic, such as polypropylene, polyamide, or polyester, or two melt-compatible plastics, they can all be melt sealed or sinter-bonded or welded or otherwise joined together at the joint shown in FIG. 4.

The filter assembly of the invention is not position-sensitive, and can be oriented as desired, horizontally, vertically, or at any selected angle to the horizontal or vertical. Normally, however, the filter assembly will be oriented as shown in the drawings, with the housing or cover 2 uppermost.

The housing parts can be formed of any desired material. For use as a pharmaceutical filter, all parts must be sterilizable. Plastic materials not susceptible to attack by the pharmaceutical fluid being filtered can be used, of which polypropylene is preferable, and polyamides and polyesters also acceptable. Plastic materials which are sufficiently rigid to be capable of retaining their dimensions under pressure, and inert enough to withstand the sterilization procedures will be found preferable in many instances because of their ease of fabrication by molding to any desired configuration. Suitable plastic materials include polyesters, polycarbonates, polyoxymethylene resins, polyamides, phenol-formaldehyde resins, polytetrafluoroethylene, polychlorotrifluoroethylene, polypropylene, polyethylene, polybutylene and polysulfones.

The filter will be of a material selected to withstand attack by the pharmaceutical fluid being filtered, and also withstand the internal pressure of the system, while at the same time being sufficiently inert to withstand sterilization procedures. Metal and plastic can be used. Metallic wire mesh, such as stainless steel mesh, aluminum wire mesh, and similar inert metallic wire materials can be used. Plastic monofilament mesh is also suitable, such as, for example, nylon mesh, polypropylene mesh, and polyester mesh (particularly the polyester mesh described and claimed in U.S. Pat. Nos. 3,701,433, 3,765,537, and 3,765,536, patented, respectively, Oct. 21, 1972, Oct. 16, 1973, and Oct. 16, 1973).

The pore size of the filter can be as large or as small as required, ranging from as low as about 0.01 micron up to about 1,000 microns and more. It is frequently desirable to use a plurality of filter layers of differing porosity, usually with the porosity decreasing in the direction of flow, as in the filter cascades of U.S. Pat. Nos. 3,765,537 and 3,765,536.

For pharmaceutical uses, the filter should be capable of removing bacteria. This requires an absolute pore size below 0.3 micron. For this purpose, porous membranes and sheets of plastic are preferred.

Suitable materials are described in U.S. Pat. Nos. 3,238,056, 3,246,767, 3,353,682, 3,573,158, and 3,696,932, patented, respectively, Mar. 1, 1966, Apr. 19, 1966, Nov. 21, 1967, Mar. 30, 1971, and Oct. 10, 1972.

It is quite advantageous to form the housing, end caps, and filter of the same plastic material, such as polypropylene, polyamide, or polytetrafluoroethylene.

It will be apparent that the filter assembly of the invention possesses numerous advantages, particularly adapting it for use as a pharmaceutical filter. The filter element end cap with an integrally molded sealing lip eliminates the necessity for internal seals, and provides an acceptable sanitary sterile closure. In the event of a damaged or faulty seal, it is impossible for downstream filtered effluent to be contaminated by upstream unfiltered influent, since there is no internal leakage path. The multiplanar angled sealing surfaces of the two housing parts are formed to mate precisely with the lip of the end cap, thus providing positive locating and holding of the filter element in place for bonding thereto without clamping force. Since there are no internal fittings or glands, the interior surfaces of all the filter assembly parts are completely and easily accessible, for positive sterilization and sanitary cleaning. The sealing and configuration of the element end cap downstream of the filter are precisely designed, so as to guarantee the integrity of the filter element under the most rigorous operating conditions. The applicability of Luer-lok and/or Pharmaseal fittings to the line vent and drain connections make the assembly adaptable for connection to any kind of standardized receptacle. By using molding dies which are precisely finished and polished, a housing of superior appearance and cleanability is obtained.

Having regard to the foregoing disclosure, the following is claimed as inventive and patentable embodiments thereof:

1. A disposable unitary filter assembly free from internal seals for filtering pharmaceutical fluid materials without danger of microorganism contamination of downstream filter effluent in the event of leakage of unfiltered fluid material past a filter seal, comprising, in combination, a filter housing of plastic material comprising first and second housing parts; the first housing part having a first fluid chamber open at one side, a fluid port opening into the fluid chamber, and a peripheral sealing surface extending in at least two planes at an angle to each other of from 30° to 150°; the second housing part having a second fluid chamber open at one side, a fluid port opening into the fluid chamber and a peripheral sealing surface extending in at least two planes at an angle to each other of from 30° to 150°; a filter element disposed in the second fluid chamber in the second housing part and comprising a tubular filter confined between and sealed in a fluid-tight seal to end caps at each end thereof, of which a first end cap is closed, and a second end cap is of plastic material and has an opening therethrough communicating the interior of the tubular filter with the first fluid chamber, and a peripheral lip extending into sealing engagement with and between the peripheral sealing surface of each housing part in each plane thereof and permanently bonded thereto; the peripheral lip extending across and sealingly closing off the open sides of the first and second fluid chambers, so that fluid communication therebetween is restricted to the opening in the second end cap via the filter, and the leakage path at the end cap peripheral lip does not bypass the filter, but runs to the exterior of the housing between the lip and one housing part.

2. A filter assembly in accordance with claim 1, in which the housing parts and filter end cap lip are integrated together in a leak-tight seal.

3. A filter assembly in accordance with claim 2, in which the housing parts and filter end cap lip are of the same plastic material.

4. A filter assembly in accordance with claim 3, in which the plastic material is polypropylene.

5. A filter assembly in accordance with claim 1, in which the second housing part is provided with a vent opening into an upper portion of the second chamber.

6. A filter assembly in accordance with claim 1, in which the second housing part is provided with a drain opening into a lower portion of the second chamber.

7. A filter assembly in accordance with claim 1, in which the peripheral sealing surfaces are at an angle of about 90° to each other.

8. A filter assembly in accordance with claim 1, in which the housing parts are formed of molded plastic.

9. A filter assembly in accordance with claim 1, in which the filter is a plastic membrane.

10. A filter assembly in accordance with claim 1, in which the filter has a pore size of less than 0.3 micron absolute.

11. A filter assembly in accordance with claim 1, in which the filter is supported on an internal core.

12. A filter assembly in accordance with claim 1, in which the filter comprises a multiplicity of filters of differing pore size, arranged in the order of decreasing pore size in the direction of fluid flow through the filter element.

13. A filter assembly in accordance with claim 1, in which the filter is supported with an external sheath.

14. A filter assembly in accordance with claim 1, in which the peripheral lip on the second end cap extends between the housing parts in a manner to prevent a seal between the lip and at least one housing part, so as to maintain a leakage path to the exterior of the housing.

15. A filter assembly in accordance with claim 1, in which one of the housing parts has a connector for joining the housing part to a fluid line that protects sealing means for the connector from contact with fluid passing through the housing and the connector, comprising, a first connector having a fluid passage therethrough and attached to and extending outwardly from the filter housing part and having side surfaces adapted for attachment to lapped side surfaces of a second connector for a fluid line; a second connector having a fluid passage therethrough and removably attached to the first connector and concentric therewith in a manner such that one connector is within the other and side surfaces thereof extend along side surfaces of the first connector; sealing means disposed between and sealing the juxtaposed side surfaces of the first and second connectors in a fluid-tight seal; the outer connector extending beyond the inner connector and having an inwardly tapering fluid passage wall having a lesser diameter than the outside diameter of the inner connector and engaging the end of the inner connector in a fluid-tight seal, preventing entry of fluid between the connectors and thereby preventing fluid from reaching the sealing means.

16. A connector for attaching a filter housing to a fluid line that protects sealing means for the connector from contact with fluid passing through the housing and the connector, comprising, in combination, a filter housing having a fluid chamber, a fluid port opening into the fluid chamber, and a first connector having a fluid passage therethrough and attached to and extending outwardly from the filter housing, and having side surfaces adapted for attachment to lapped side surfaces of a second connector for a fluid line; a second connector having a fluid passage therethrough and removably attached to the first connector and concentric therewith in a manner such that one connector is within the other and side surfaces thereof extend along side surfaces of the first connector; sealing means disposed between and sealing the juxtaposed side surfaces of the first and second connectors in a fluid-tight seal; the outer connector extending beyond the inner connector and having an inwardly tapering fluid passage wall having a lesser diameter than the outside diameter of the inner connector and engaging the end of the inner connector in a fluid-tight seal, preventing entry of fluid between the connectors and thereby preventing fluid from reaching the sealing means.

17. A filter assembly in accordance with claim 16, in which the first and second connectors are threadably attached together in a leak-tight seal.

18. A filter assembly in accordance with claim 16, in which the sealing means is an O-ring seal.

19. A filter assembly in accordance with claim 16, in which the first connector is concentrically disposed within the second connector.

* * * * *